March 28, 1939.  J. H. WILSON  2,152,425
AUTOMOTIVE TRAVELING SPRINKLER
Filed Nov. 3, 1937  2 Sheets-Sheet 1
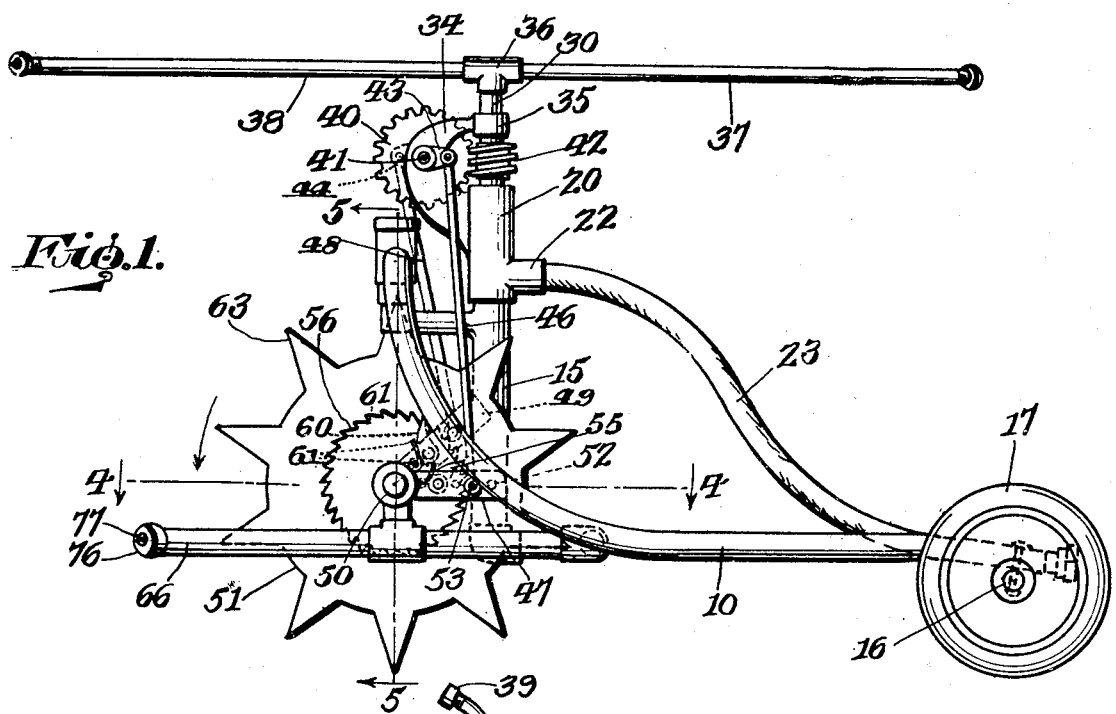
INVENTOR
JOHN H. WILSON
ATTORNEY

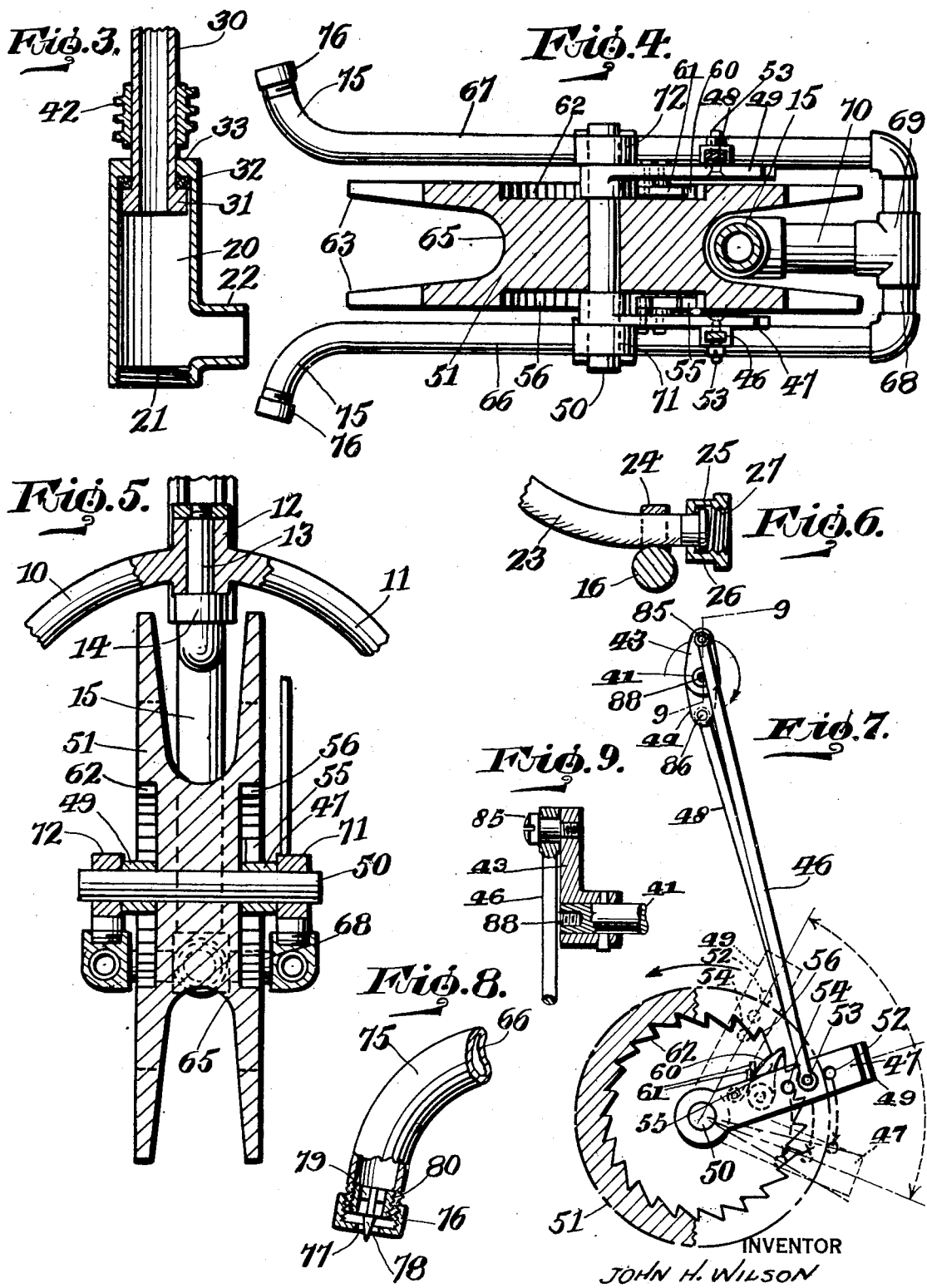

Patented Mar. 28, 1939

2,152,425

UNITED STATES PATENT OFFICE 2,152,425

AUTOMOTIVE TRAVELING SPRINKLER

John H. Wilson, North Platte, Nebr.

Application November 3, 1937, Serial No. 172,634

5 Claims. (Cl. 299—50)

This invention relates to a lawn sprinkler.

An object of the invention is the provision of a sprinkler which is movable over a lawn in which a motor is operated by the water power being forced through the sprinkler, said sprinkler being guided by the hose attached thereto when desired.

Another object of the invention is the provision of a sprinkler which is propelled by the force of water supplied to said sprinkler through a hose in which a traction wheel is rotated for moving the sprinkler over the lawn, a rear carriage being provided which has a swivel connection for the forward carriage supported by the front wheel, the swivel connection providing a turning movement of the sprinkler from a straight line.

A further object of the invention is the provision of a hollow post which is supported by a toothed wheel, the post being supplied with water under pressure which is delivered from the post to a spraying device constituting a motor having operative connections with the toothed wheel whereby the wheel is rotated and the sprinkler is propelled over a lawn, the toothed wheel having an annular groove through which rises the post.

Another object of the invention is the provision of a wheeled carriage including a traction wheel which is propelled by a combined sprinkling device and motor operated by water under pressure, the wheel having a plurality of series of annular teeth engageable by pawls carried on oscillating levers so that when one pawl is being moved in a reverse and inoperative position, the other pawl has operative engagement with its set of teeth for rotating the wheel, one of the pawls being capable of being disengaged from its set of teeth so that the toothed wheel will cause the sprinkler to be moved intermittently over a lawn, the levers being connected with a gear revolved by the motor by means of links which have adjustable connections with the levers in order to change the speed of rotation of the toothed or traction wheel.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawings:

Figure 1 is a side view in elevation of a sprinkling device constructed in accordance with the principles of my invention, Figure 2 is a plan view of the same, Figure 3 is an enlarged vertical section through the upper end of a stationary post and motor shaft, Figure 4 is a horizontal section taken along the line 4—4 of Figure 1, Figure 5 is a vertical section taken along the line 5—5 of Figure 1, Figure 6 is a fragmentary vertical section taken on the line 6—6 of Figure 2, Figure 7 is an enlarged diagrammatic figure of the operating means for the traction wheel, Figure 8 is an enlarged fragmentary plan view partly in section of a nozzle at the forward end of the sprinkler, and Figure 9 is a cross section taken along the line 9—9 of Fig. 7.

Referring more particularly to the drawings, 10 and 11 designate a pair of arms which are connected together at their forward ends to form a bearing 12 mounted upon a pintle 13 formed at the upper end of a bracket 14 which is rigidly connected to a vertically disposed hollow post 15.

An axle 16 is connected to the ends of the arms 10 and 11 and wheels 17 are mounted for rotation at the ends of the axle. The construction just described forms the rear wheel supporting carriage or frame of the sprinkler.

A cylinder 20 is threadedly connected at 21 to the upper end of the hollow post 15 and is provided with a nipple 22 to which is attached one end of a flexible hose 23.

The hose extends rearwardly and is held to the rear axle 16 by means of a bracket or clamp 24. The hose is provided with a flange 25 at its rear end which is nested within a socket 26. This socket is internally threaded at 27 to receive the threaded end of a hose connection. The last-mentioned hose, however, may be of any length and is of the usual type employed in gardens known as rubber hose.

A motor shaft 30 (Fig. 3) has a flange 31 at its lower end and this flange is received within the cylinder 20. A washer 32 is located between the flange 31 and an inturned flange 33 formed on the upper end of the cylinder 20. The last-mentioned flange is provided with an opening through which the shaft 30 projects. The shaft is held in a predetermined position by means of brackets 34 which are secured to or formed integrally with the cylinder 20. The brackets are provided with a collar or bearing 35 which receives the shaft 30.

The hollow shaft 30 which is in communication with the cylinder 20 has a head 36 from which project hollow radial arms 37 and 38. These arms at their free ends are provided with laterally disposed nozzles 39 through which the water is adapted to be projected against the air whereby the arms will be revolved as will be the shaft 30 so that these arms and said shaft constitute a motor for a purpose which will be presently explained. A worm gear 40 is secured to a shaft 41 which is carried by the brackets 34 and this worm gear meshes with a worm 42 rigidly connected to the shaft 30 so that said worm will revolve with the shaft and thus cause rotation of the worm gear 40.

At one end of the shaft 41 is secured a crank 43 and at the other end is secured a crank 44. These cranks are displaced at an angle of 180°.

A link 46 is connected with the crank 43 and also with a lever 47. The crank 44 is connected by a link 48 with a lever 49. The lever 47 is pivotally mounted on an axle 50 at one side of the face of a traction wheel 51 while the lever 49 is pivoted on said axle at the opposite face of said traction wheel. It will be noted that each of the levers is provided with a plurality of passages 52, 53, and 54 to receive the lower end of the links 46 and 48 for varying the throw or for varying the arc through which the levers are moved.

The lever 47 is provided with a pawl 55 pivotally mounted on said lever and maintained in a predetermined position by a spring 61. The free end of the pawl is adapted to engage a series of teeth 56 formed at one face of the traction wheel 51. A pawl 60 pivotally mounted on the lever 47 and maintained in a predetermined position by a spring 61 is adapted to engage a series of teeth 62 formed on the opposite face of the traction wheel 51 (Fig. 7).

The traction wheel 51 is provided with a plurality of teeth 63 which are adapted to penetrate the ground in order that the wheel will have sufficient traction with the lawn to pull the sprinkler over the same. The wheel is also provided with an annular groove 65 through which the post 15 projects but this groove is also adapted to receive the flexible hose connected with the water supply of the house and also with the member 27 on the flexible tube or hose 23.

A front frame consists of a pair of longitudinally disposed hollow pipes 66 and 67 which are connected together at their inner ends with a short pipe 68. A T-connection 69 provides means for connecting the pipes 66 and 67 through a short pipe 70 with the interior of the hollow post 15 so that water from the flexible tube 23 under pressure is also supplied to the pipes 66 and 67.

The pipes 66 and 67 also provide a support for bearings 71 and 72 for the axle 50 upon which the traction wheel 51 is mounted. The bearings 71 and 72 are rigidly connected to the pipes 66 and 67 in any approved manner.

The outer end of each pipe 66 and 67 is curved outwardly as shown at 75 and the free end of the pipe is provided with a turnable cap 76 having a reduced passage 77 through which water is adapted to be sprayed and controlled by a valve 78 carried by a spider 79 threaded at 80 into the end of the laterally disposed portions 75 of either the pipes 66 or 67. The cap 76 is adapted to be adjusted towards or away from the end of the laterally disposed portion 75 of either of the pipes for varying the flow of water through the passage 77. In other words as the cap 76 is screwed further onto the end of the pipe 66 or 67 the flow of water will be reduced while the opposite direction of rotation of the cap will increase the flow of water.

The operation of my device is as follows: Water is supplied to the flexible tubular member 23 by being connected in the usual manner with the threaded nipple of a garden hose and the water passes through the post 15 into the chamber 20 and into the hollow shaft 30 whence the water flows through the offset ends of the radial arms 37 and 38 and thus cause the arms to rotate.

The rotation of the arms and likewise the shaft 30 will cause rotation of the worm 42 and the worm gear 40 so that the cranks 43 and 44 will be revolved through 360° whereby the links 46 and 48 will be reciprocated and the levers 47 and 49 will be oscillated on their pivotal connections with the axle 50. When this happens the pawl 60 being in engagement with the teeth 62 will cause the traction wheel 51 to revolve in the direction indicated by the arrow in Fig. 7 because of the upward movement of the lever 49. The lever 47 will simultaneously be moved downwardly but the pawl 55 will ride over the teeth 56 and thus will be negative.

When the crank 43 (Fig. 7) reaches its lowermost position the crank 44 will start its downturned movement and the pawl 55 will engage the teeth 56 and continue the rotation of the traction wheel 51. Thus it will be seen by the plurality of pawls that the traction wheel will be revolved continuously as long as the water motor is being operated and thus the sprinkler will be propelled over the lawn.

When, however, it is desired either pawl 55 or pawl 60 may be moved to an inoperative position and held in this position by a mechanism presently to be described.

When one of the pawls is released from operative engagement with its respective set of teeth the sprinkler will be moved intermittently across the lawn. In other words if the pawl 60 were moved to an inoperative position the pawl 55 would rotate the wheel 51 through a predetermined arc and as long as the pivot 85 is moving from its lowermost position to its uppermost position said pawl will be engaged by the teeth 56. However, when the pivot 85 (Fig. 7) moves downwardly from its uppermost position, said pawl will be dragged over the teeth and the traction wheel will remain stationary. Thus the sprinkler will be immovable. In this manner the intermittent movement of the sprinkler will cause the sprinkler to remain at predetermined points along its path for a period which will be equal to the time required for the pawl 55 to move idly over the teeth 56 and a great amount of sprinkling will be had at such point. Either pawl 55 or 60 may be released for the purpose.

During especially dry seasons it may be desired to decrease the speed of the sprinkler across definite paths in the lawn in order to increase the moisture supplied at this time. When this is desired it is necessary to release the connection 53 of the link 46 from the perforation in the lever 47 and move it over to the outermost perforation 52 of the lever 47. It is also necessary to disconnect the link 48 from the lever 49 from the position shown in Fig. 7 and move it over to the perforation 52 of the lever 49 so that the pawls 55 and 60 will have a shorter stroke.

On the other hand when the connection between the links 46 and 48 is made respectively with the perforations 54 of the levers 47 and 49 the throw of the pawls will be lengthened and the arc of oscillation of the levers 47 and 49 will be increased so that the speed of the rotation of the traction wheel 51 will likewise be increased and therefore the sprinkler will be moved with greater rapidity than formerly.

The water under pressure is not only supplied to the cylinder 20 and the motor shaft 30 but it is also supplied from the post 15 to the pipes 66 and 67 so that the water will be sprayed laterally at opposite sides of the sprinker and slightly forwardly due to the fact that the ends of the pipe 60 and 67 are curved outwardly, as shown at 75.

As the sprinkler is drawn over the lawn it will pull the hose along therewith and, as has been previously explained, the hose may be employed for guiding the sprinkler when the groove 65 in the wheel 51 is placed over the hose. The traction wheel 51 when operated by the water motor draws the carriage along with the wheeled frame pulling up the rear end of the hose, since the flexible hose which is connected to the source and also to the pipe 23 is connected to the fixed nipple in the rear of the wheeled frame. The traction wheel will not only ride on the remaining portion of the hose and be guided in a definite path as defined by the hose but the traction wheel will pull the hose along until the traction wheel reaches the source of supply or where the flexible hose is connected to the source of supply. In starting the wheeled carriage along a definite path the traction wheel 51, as explained, straddles the hose and the front of the carriage where the traction wheel is located will move forwardly. Because of this fact it is necessary to bend the hose slightly upon itself at the rear end so that as the device moves along the hose, the outer end of the hose where it is connected to the wheeled carriage will be pulled along the ground.

When it is desired to place either of the pawls 55 or 60 in an inoperative position it is only necessary to disconnect the upper end of the link 46 or 48 from the levers 43 and 44, respectively, and place the disconnected upper link end onto the shaft 41.

In order to disconnect the link 46 from the lever 43 the set screw 85 is removed from its threaded connection with the lever 43 and the upper end of the link is then brought downwardly until said set screw aligns with the threaded pocket 88 in the shaft 41. The set screw is then screwed into place. If it is desired to place the link 48 in an inoperative position, the set screw 86 is removed and the upper end of the link is moved upwardly until the set screw aligns with a threaded pocket at the opposite end of the shaft 41, and said screw is screwed into the threaded pocket at this point. By this means the link 46 or the link 48 which has thus been adjusted will remain in an inoperative position and either the lever 47 or the lever 49 will remain inoperative.

I claim:

1. An automotive sprinkler comprising a hollow post, a wheeled frame having swiveled connections with the post, a hose connected to the post and supplying water to said post, hollow arms projecting radially from the post, means rotatably mounting the arms on the post and placing the post in communication with the arms, a worm on the mounting, a worm gear carried by the post and meshing with the worm, a tractor wheel, means supporting the post on the wheel, means operatively connecting the wheel with the worm gear so that when the worm is revolved by water issuing from the arms the traction wheel will be revolved for propelling the sprinkler, said supporting means including hollow pipes at each side of the traction wheel and in communication with the post for spraying water forwardly of said wheel.

2. An automotive sprinkler comprising a hollow vertical post, a traction wheel located forwardly of the post, means connecting the post to the wheel, a wheeled frame swiveled on the post and forming a rear support for the post, hollow sprinkler arms projecting radially from said post, means rotatably mounting the arms on the post and placing the arms in communication with the post, means for supplying water under pressure to the post, means operatively connecting the rotatable mounting to the traction wheel for causing rotation of the wheel, the connecting means between the post and the wheel including pipes in communication with the post and extending beyond the wheel and means on the free end of the pipes for projecting water forwardly of the wheel.

3. An automotive sprinkler comprising a hollow post, a traction wheel, means connecting the post with the traction wheel, means cooperating with said wheel for supporting said post above the ground, a combined sprinkling means and motor mounted for rotation on the post, a gear mounted for rotation on the post, means operatively connecting said gear with the motor, a pair of levers having one end each pivoted at the center of the traction wheel, said wheel being provided with an annular series of teeth at each face of the wheel, a pawl on each lever, one pawl adapted to engage the teeth at one face, the other pawl adapted to engage the other set of teeth, links connected with the levers, means connecting the links eccentrically, means for supplying the motor with water under pressure, said levers being located at an angle to each other so that when one pawl is forcing the wheel through a predetermined arc the other pawl is inactive.

4. An automotive sprinkler comprising a hollow post, a traction wheel, means connecting the post with the traction wheel, means cooperating with said wheel for supporting said post above the ground, a combined sprinkling means and motor mounted for rotation on the post, a gear mounted for rotation on the post, means operatively connecting said gear with the motor, a pair of levers having one end each pivoted at the center of the traction wheel, said levers being angularly displaced relative to each other, said wheel being provided with an annular series of teeth at each face of the wheel, a pawl on each lever, one pawl adapted to engage the teeth at one face, the other pawl adapted to engage the other set of teeth, a link connected with each lever, means connecting the links eccentrically with the gear, means for supplying the motor with water under pressure, said wheel having an annular groove for engagement with a guide for directing the wheel along a predetermined path.

5. An automotive sprinkler comprising a hollow post, a traction wheel, means connecting the post with the traction wheel, means cooperating with said wheel for supporting said post above the ground, a combined sprinkling means and motor mounted for rotation on the post, operative connections between the motor and wheel for causing rotation of the wheel, means for supplying the motor with water under pressure through the post, the connecting means between the post and the wheel including pipes in communication with the post to receive water under pressure from the post, and nozzles on the free ends of the pipes for projecting streams of water forwardly of the wheel.

JOHN H. WILSON.